United States Patent [19]
Miwata et al.

[11] Patent Number: 5,705,046
[45] Date of Patent: Jan. 6, 1998

[54] PROCESS FOR TREATING EFFLUENT FROM FLUE-GAS DESULFURIZATION SYSTEM AND APPARATUS THEREFOR

[75] Inventors: Tatunori Miwata, Nagoya; Tsumoru Nakamura, Hiroshima; Shinichiro Kotake, Tokyo; Yoshiharu Aoki, Ichihara, all of Japan

[73] Assignees: Chubu Electric Power Company, Incorporated, Aichi-ken; Mitsubishi Jukogyo Kabushiki Kaisha; Asahi Glass Company Ltd., both of Tokyo, all of Japan

[21] Appl. No.: 484,820

[22] Filed: Jun. 7, 1995

Related U.S. Application Data

[63] Continuation-in-part of Ser. No. 384,236, Feb. 6, 1995, abandoned, which is a continuation of Ser. No. 954,481, Sep. 30, 1992, abandoned.

[30] Foreign Application Priority Data

Oct. 17, 1991 [JP] Japan ................................ 3-269361
Oct. 17, 1991 [JP] Japan ................................ 3-269362

[51] Int. Cl.$^6$ ..................................... B01D 53/50
[52] U.S. Cl. ............... 204/523; 204/525; 204/529; 204/634; 423/243.1
[58] Field of Search .................. 204/634, 523, 204/529, 525; 423/243.1; 210/651

[56] References Cited

U.S. PATENT DOCUMENTS 4,802,966  2/1989  Aoki et al. ................ 204/182.4
5,433,936  7/1995  Ukawa et al. .............. 423/243.01

FOREIGN PATENT DOCUMENTS 0139802  5/1985  European Pat. Off. .
0405619  1/1991  European Pat. Off. .
2808364  9/1979  Germany .
3713143  10/1987  Germany .
5968  2/1980  Japan .

*Primary Examiner*—Neil McCarthy
*Attorney, Agent, or Firm*—McAulay Fisher Nissen Goldberg & Kiel, LLP

[57] ABSTRACT

A process for treating effluent from a flue-gas desulfurization system wherein the resulting gypsum is removed, comprises filtering the gypsum and fly ash free effluent by a filter, transferring the filtrate to an electrodialyzer wherein cation-exchange membranes and univalent anion-exchange membranes are alternately set up, concentrating chlorine ions in the solution therein by dialysis, further concentrating the solution by evaporation in an evaporator, kneading the concentrated solution with cement or a mixture of cement and coal ash to a solid matter with no harm, and thereafter abandoning for landfill; and an apparatus for treating effluent from a flue-gas desulfurization system, comprising a filter for filtering the effluent to a turbidity low enough for treatment by an electrodialyzer wherein the effluent is to be separated into concentrated and dilute solutions, the electrodialyzer equipped with an alternate arrangement of cation- and anion-exchange membranes, with concentration and dilution compartments alternately provided between the both ion-exchange membranes, means for conducting the concentrated solution to a step for final disposal, and means for recycling the dilute solution as makeup water to the desulfurization system.

4 Claims, 8 Drawing Sheets

PROCESS FOR TREATING EFFLUENT FROM FLUE-GAS DESULFURIZATION SYSTEM AND APPARATUS THEREFOR

This application is a continuation-in-part of application Ser. No. 08/384,236, filed Feb. 6, 1995, abandoned, which in turn is a continuation of Ser. No. 07/954,481, filed Sep. 30, 1992, abandoned, the contents of each of which are incorporated herewith by reference.

FIELD OF THE INVENTION AND RELATED ART STATEMENT

The present invention relates to a process for treating the effluent from a flue-gas desulfurization system and an apparatus therefor.

More particularly, the invention concerns a process which, in the course of flue-gas desulfurization wherein sulfur oxides acid gas (hereinafter called, together with other similar substances, "$SO_x$ gas") in the flue gas is fixed and separated as gypsum in the effluent, comprises concentrating the gypsum and fly ash free effluent by electrodialysis and evaporator, kneading it with cement or a cement-coal ash mixture to a solid matter, and disposing of it as a harmless refuse. The invention also pertains to an apparatus for treating (for volume reduction) of the effluent from a flue-gas desulfurization system wherein $SO_x$ gas is separated by absorption from flue gas using limestone or other alkaline agent as the absorbent.

For the removal of $SO_x$ gas from flue gas or other combustion waste gas the use of limestone or hydrated lime slurry for its fixation and separation in the form of gypsum is common. The separation of gypsum leaves a large quantity of waste liquor behind, which is recycled to save the cost of effluent treatment. However, the process entails accumulation of chlorine ions in the waste liquor. In view of the materials used in the flue-gas desulfurization system, the chlorine ion concentration in the liquid usually must be kept below 10,000 ppm. With this level as the ceiling, the waste liquor is extracted as an effluent whenever the level is surpassed upwardly.

The effluent contains various constituents including: solids such as gypsum that results from reaction within the desulfurization system and limestone and other substances that did not take part in the reaction; salts such as calcium chloride, magnesium chloride, and iron chloride formed by reaction of the chlorine gas (hereinafter called "Cl gas") in the flue gas with calcium, magnesium, etc. in the absorbent; oxides of metals such as silica and aluminum in the flue gas; fluorine, chemical oxygen demanding (COD) substances, and the burnt ashes in combustion waste gas captured in the desulfurization system. To prevent secondary pollution, the effluent cannot be discharged into public watercourses. It is usually treated at much cost as follows.

FIG. 4 is a flow chart of a conventional art installation for effluent treatment. A conventional process for effluent treatment will now be explained in conjunction with the chart. The effluent from a desulfurization system that is to be treated by this equipment, i.e., the solution to be treated, is led through line aa into an undiluted solution tank 401 for temporary storage. The solution is later fed through line bb to an acid decomposition tank 402, where acid constituents contained in the solution are decomposed. The solution is then conducted through line cc to a solids separation tank 403 where solid constituents are separated from the liquid. While the solution being treated passes through the line cc, an alkali for adjusting the hydrogen ion concentration (hereinafter referred to merely as "pH") of the solution, a coagulant and the like are introduced via line dd. In the solids separation tank 403 solids, such as limestone, gypsum, and combustion residue, are separated from the solution. A solution depleted of solids (hereinafter called "the solid-free solution") and a solution enriched with solids (hereinafter called "the solid-dense solution") are discharged from the tank 403.

The solid-dense solution is sent through line ee to a dehydrator 404, where it is further separated into liquid and solids. The liquid and solids thus separated are driven off from the effluent treatment system via lines ff and gg, respectively.

On the other hand, the solid-free solution from the solids separation tank 403 is sent through line hh to a precision filter 405 such as a sand filter. Here the solid matter not separated in the solids separation tank 403 is separated from the solution. The solution thus made cleaner is conducted through line ii into a treated solution tank 406 for storage. The treated effluent in the solution tank 406 is discharged (after having been confirmed to meet the effluent emission standards) via line jj to a public watercourse.

The conventional effluent treatment installation, as described above, comprises a variety of traits including an acid decomposition tank 402 for the treatment of COD substances, a solids separation tank 403 for the separation of solids, and a pH adjustment tank (corresponding to line cc) for adjusting the pH of the effluent being treated.

Thus, the installation is complex in setup, and the individual component units require complicated controls for operation. The operational controls have significant bearings upon the properties of the effluent being discharged from the installation. Under certain circumstances they can render the discharge from the treated solution tank 406 impossible and, in extreme cases, stop the whole system of effluent treatment.

The complexity of installation setup combines with the difficulty of operational control to boost the costs of installation, operation, and maintenance. In addition, they call for a large tract for the site of installation.

In the background of such circumstances, recently, the treating method of concentrating the wastewater by electrodialysis and evaporator to decrease the volume, and making into a form disposable for landfilling is being considered to be useful, and the present inventors had already disclosed a proposal about this method (Japanese patent application Hei.3-263710).

To clarify the role and configuration of this electrodialysis in the treating process, a flow chart of this treating method is shown in FIG. 9. In FIG. 9, reference numeral 101 is a receiving tank, 102 is a filter, 103 is an electrodialysis apparatus, 104 is an evaporator, and 105 is a solidifier. The wastewater from the desulfurization plant (not shown) is once stored in the receiving tank 101, and sent into the filter 102, in which the turbid matter in the wastewater is filtered in order to prevent clogging of the dialysis film installed in the electrodialysis apparatus 103. In the electrodialysis apparatus 103, the wastewater is evaporator 104 in the downstream. On the other hand, the solution in which the dissolved matter is diluted (hereinafter "diluted solution") is recycled as makeup water for the desulfurization plant. The solution concentrated in the electrodialysis apparatus 103 (hereinafter called "concentrated solution") is further concentrated in the evaporator 104, and the concentrated solution is sent into the solidifier 105, where cement and coal ash are supplied as solidification aid to knead with the concentrated solution form the evaporator 104 to be solidified.

The layout of dialysis membranes installed in the electrodialysis apparatus 103 is shown in FIG. 10. In FIG. 10, reference numeral 201 is an anode plate, 202 is a cathode plate, 203 is a cation exchange membrane, and 204 is an anion exchange membrane. A direct current is applied between the anode plate 201 and cathode plate 202. Between the anode plate 201 and the adjacent cation exchange membrane 203, an anodic solution such as sodium chloride is supplied through line AA, and is discharged through line AA', thereby forming a circulation route, and between the cathode plate 202 and the adjacent anion exchange membrane 204, a cathodic solution such as hydrochloric acid is supplied through line BB, and is discharged through line BB', thereby forming similarly a circulation route. In FIG. 10, the cation exchange membrane 203 and anion exchange membrane 204 are arranged alternately with each other, except for the portions close to each of the pole plates, so that the diluted solution and concentrated solution mutually communicate.

As shown in FIG. 10, the diluted solution is supplied from the diluted solution tank (not shown) into the electrodialysis apparatus through line CC, and calcium chloride, magnesium chloride, and mainly soluble salts pass through the dialysis membrane in the electrodialysis apparatus, and move into the adjacent chamber of concentrated solution. The remaining solution is discharged through line CC', and returns to the diluted solution tank. The desulfurized wastewater sent through the filter is accepted in the diluted solution tank, and the diluted solution diluted in the salt concentration is supplied from the diluted solution tank into the desulfurization plant as makeup water. On the other hand, the concentrated solution is supplied from the concentrated solution tank (not shown) into the electrodialysis apparatus through line DD, and the soluble salts passing through the dialysis membrane are transferred, and discharged through line DD',thereby returning to the concentrated solution tank.

The anion exchange membrane to be used is a monovalent anion selective membrane which hardly passes bivalent sulfate ions ($SO_4^{2-}$) in order to suppress scale formation due to gypsum precipitation in the downstream evaporator.

Using the electrodialysis apparatus shown in FIG. 9, when desulfurized wastewater is continuously concentrated, as mentioned above, since the molten gypsum concentration in the desulfurized wastewater is saturated, and hence gypsum precipitates in the anion exchange membrane, and the separation performance of the exchange membrane is extremely lowered, and finally the membrane is broken, which was confirmed experimentally by the present inventors. The cause of precipitation of gypsum in the anion exchange membrane is estimated as follows: the concentration of calcium ions $Ca^{2+}$ and sulfate ions $SO_4^{2-}$ for forming gypsum on the fluid boundary membrane near the membrane is raised, and the ion concentration in the membrane is raised gradually according to the ion balance rule of the membrane and the contacting liquid known as donor balance, finally reaching the concentration exceeding the gypsum solubility, that is, the oversaturated state. Such gypsum precipitation is closely related with the amount of current applied by unit area, that is, the current density, and becomes evident as the current density increases,and as known already by the inventors quantitatively, it is difficult to concentrate by the current density used in the conventional seawater concentration in the desulfurized wastewater treated in the invention. Moreover, the current density has a great effect on the required membrane area of the ion exchange membrane to be used, and as the current density becomes lower, the required membrane area increases proportionally, and the facility cost is increased, and hence there is a limitation for decrease of current density. Thus, in actual management, in the concentration operation, gypsum precipitation occurs in the anion exchange membrane, and stable operation for a long period is difficult.

OBJECT AND SUMMARY OF THE INVENTION

The present invention has for its object to provide a process and an apparatus for treating the effluent from a flue-gas desulfurization system while overcoming the above-described defects of the prior art.

The invention, in the first aspect for the solution of the above defects, resides in a process for treating effluent from a flue-gas desulfurization system wherein flue gas containing sulfur oxides gas is brought into contact with limestone or hydrated lime slurry and the sulfur oxides gas is thereby absorbed and removed and then fixed and separated as gypsum, which process comprises filtering the liquid freed from the gypsum and other suspended matters by a filter, transferring the filtrate to an electrodialyzer wherein cation-exchange membranes and univalent anion-exchange membranes are alternately set up, concentrating chlorine ions in the solution therein by dialysis, further concentrating the solution by evaporation in an evaporator, kneading the concentrated solution with cement or a mixture of cement and coal ash to a solid matter with no harm, and thereafter disposing of the solid matter by abandoning.

The invention, in the second aspect for the solution of the above defects, resides in an apparatus for treating effluent from a flue-gas desulfurization system wherein the desulfurization is performed using an alkaline agent, which apparatus comprises a filter for removing suspended solids from the effluent to a turbidity low enough for treatment by an electrodialyzer wherein the effluent is to be separated into a concentrated effluent enriched with solutes and a dilute effluent depleted of the solutes, the electrodialyzer communicated with the filter and equipped with an alternate arrangement of cation-exchange membranes which selectively permeate univalent and divalent cations and anion-exchange membranes which selectively permeate only univalent anions, with concentration and dilution compartments alternately provided between the both ion exchange membranes, means for conducting the concentrated solution from the concentration compartments of the electrodialyzer to a step for final disposal, and means for recycling the dilute solution from the dilution compartments as makeup water to the desulfurization system.

The invention, in the third aspect for the solution of the above defects, resides in the apparatus defined immediately above, which further comprises a concentrator for concentrating by evaporation the concentrated solution discharged from the concentration compartments of the electrodialyzer.

In the light of the above, it is another object of the invention to present a desulfurized wastewater treating electrodialysis apparatus capable of operating stably for a long period while maintaining the separation performance of the membrane by lowering the concentration of calcium ions $Ca^{2+}$ and sulfate ions $SO_4^{2+}$ which is raised gradually in the anion exchange membrane, and a treating method of desulfurized wastewater by using the same apparatus.

According to the first aspect of the invention, the filtrate freed from gypsum is separated into a dilute solution of a low chlorine ion concentration and a concentrated solution of a high chlorine ion concentration and a low sulfate ion concentration. The former is utilized as make-up water for a desulfurization system. This precludes troubles which could arise from the accumulation of chlorine ions in the desulfurization system and prevents the formation of gypsum scale in the evaporator where the effluent is concentrated before being discharged from the system.

According to the second and third aspects of the invention, the treatment of effluent by membrane separator means with high solute separation capability makes possible highly efficient separation. Combining the separator means with an evaporator permits effluent concentration at an even higher ratio.

The electrodialyzer that uses cation-exchange membranes capable of selectively permeating uni- and divalent cations and anion-exchange membranes capable of selectively permeating univalent anions can remove the sulfate ions ($SO_4^{2-}$) that form gypsum the principal constituent of the resulting solid precipitate. The removal of sulfate ions protects the evaporator where the concentrated effluent from the electrodialyzer is further concentrated, from the trouble or efficiency drop of component units under the action of the solid precipitate.

In addition, the invention presents: (1) a desulfurized wastewater treating electrodialysis apparatus to be used in an electrodialysis apparatus for concentrating molten salt contained in wastewater discharged from wet process flue desulfurization plant for absorbing and separating sulfur oxide gas in the combustion flue gas by using limestone or other alkaline agent as absorbent, in which ion exchange membranes adjacent to positive and negative pole plates for forming an electric field necessary for electrophoresis of ions are formed as anion exchange membrane by sequentially arranging three cation exchange membranes at the anode plate side, and as anion exchange membranes by sequentially arranging two cation exchange membranes at the cathode plate side, and a cation exchange membrane and anion exchange membrane are alternately arranged between the anion exchange membrane and anion exchange membrane; (2) a desulfurized wastewater treating electrodialysis apparatus of (1), wherein the anion exchange membrane is a monovalent anion selective transmission membrane; (3) a treating method of desulfurized wastewater characterized by performing electrodialysis by passing a polar fluid between both pole plates of the desulfurized wastewater treating electrodialysis apparatus of (1) and the adjacently disposed cation exchange membrane, a diluted solution between the first and second, and second and third cation exchange membranes adjacent to the anode plate, and between the first and second cation exchange membranes adjacent to the cathode plate, and the second cation exchange membrane and the adjacent anion exchange membrane, a concentrated solution between the cation exchange membrane at the other anode plate side and the anion exchange membrane side at the cathode side, and a diluted solution between the anion exchange membrane at the other anode plate side and the cation plate exchange membrane at the cathode plate side; and (4) a cleaning method of a desulfurized wastewater treating electrodialysis apparatus characterized by, in the method of (3), changing the polarity of the anode plate to the cathode, changing the polarity of the cathode plate to anode, and passing sodium chloride solution instead of diluted solution and concentrated solution.

DETAILED DESCRIPTION OF PREFERRED EMBODIMENTS

The first aspect of the invention will now be described more concretely. In this aspect, the effluent that results from flue-gas desulfurization whereby sulfur oxides gas contained in the flue gas is removed by absorption through contact of the flue gas with limestone or hydrated like slurry and then is fixed and separated as gypsum, is passed through a filter to remove fine particles of gypsum, coal fly ash and the like until a solids concentration of about 0.2 mg/l is reached. The effluent is then electrodialyzed in an electrodialyzer where cation- and univalent anion-exchange membranes are alternately set up, using a dilute sulfuric acid solution as an anolyte and a dilute hydrochloric acid solution as a catholyte. While sulfate ions (the chemical formula $SO_4^{2-}$, hereinafter referred to as such) are being removed, the effluent is concentrated to a chlorine ion concentration of; e.g., about 10 weight percent. Further, in the evaporator, the chlorine concentration is condensed to, e.g., about 25 weight percent while the evaporator is being kept from the deposition of scale, thus reducing the volume of the liquid. Eventually this liquid is solidified by kneading with cement or a mixture of cement and coal ash for abandoning.

In the meantime, the sulfate ion-containing dilute aqueous solution generated by the electrodialysis is recycled to the desulfurization system. Thus, the flue-gas desulfurization system incorporating the present invention produces no secondary effluent.

Filters of varied types appear usable for the invention. Generally, however, a unit capable of precision filtration is used because the electrodialyzer at the ensuing stage requires the removal of solids down to a solids concentration of about 0.2 mg/l.

The electrodialyzer for use in the invention comprises concentration compartments and dilution compartments formed by an alternate arrangement of cation exchange membranes and trivalent anion-exchange membranes, and cathode and anode plates at both extreme ends of the compartments. The cation-exchange membranes selectively permeate positive ions such as calcium and magnesium, while the univalent anion-exchange membranes selectively permeate univalent negative ions such as chlorine. From the both compartments concentrated solutions with a large dissolved salt content and diluted solutions lean in dissolved salts are simultaneously taken out.

Figure 2:
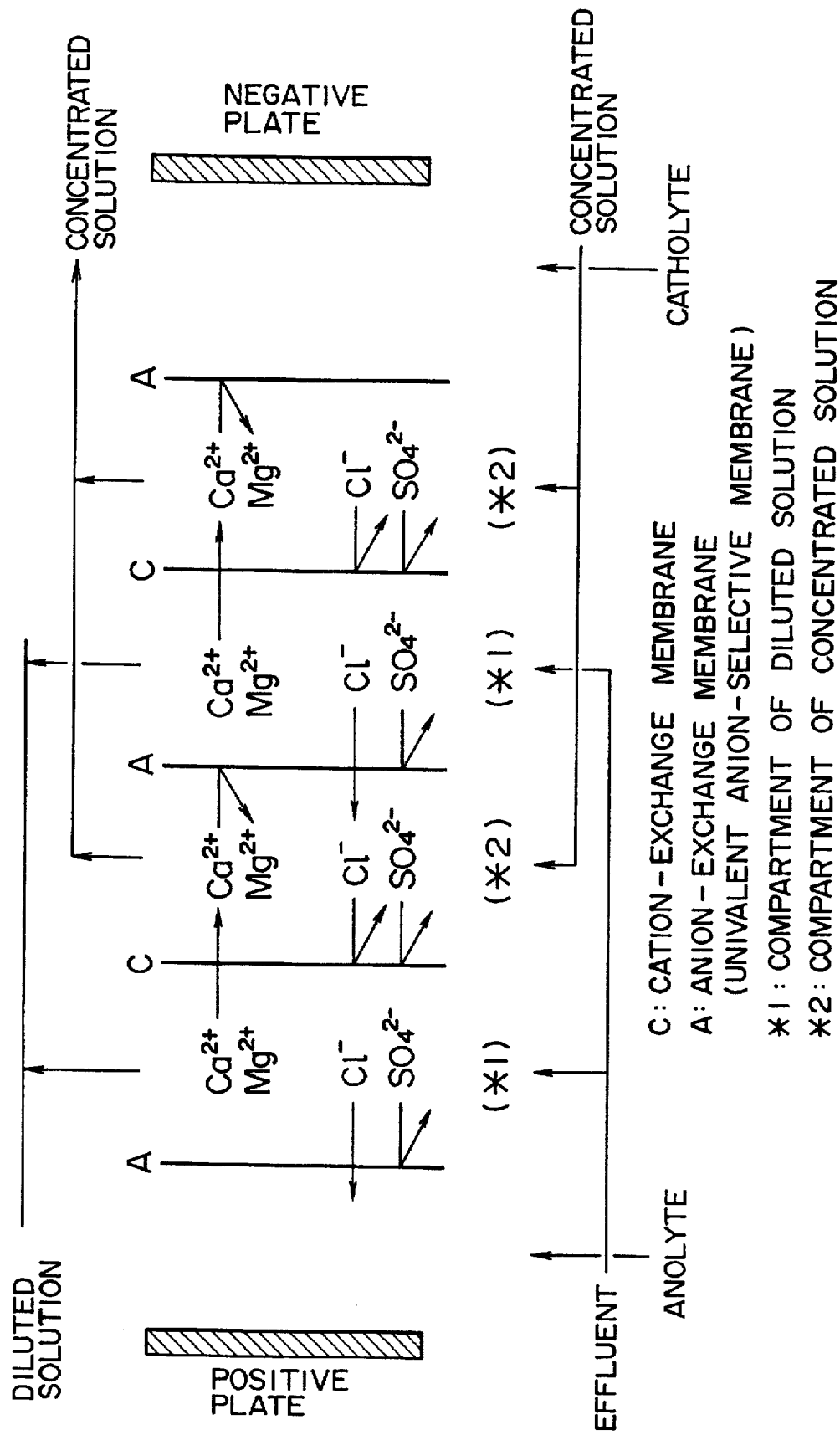
FIG. 2 is a schematic illustration of the principle of an electrodialyzer employed in the apparatus of FIG. 1.

FIG. 2 schematically illustrates the construction of the electrodialyzer and the ionic migration involved. As shown, calcium, magnesium, and chlorine ions that constitute calcium chloride ($CaCl_2$) and magnesium chloride ($MgCl_2$), the two major components in the effluent, are caused to migrate by the electric field generated between the anode and cathode plates. During the migration the ions are selectively permeated or hindered by the cation and anion-exchange membranes. The resulting concentrated and diluted solutions are taken out of the electrodialyzer. Cations such as calcium and magnesium migrate toward the cathode plate and pass through a cation-exchange membrane into a concentration compartment. They tend to continue the migration toward the cathode plate but are obstructed by a univalent anion-exchange membrane to remain in the concentration compartment. Meanwhile, chlorine ion migrates toward the anode plate and permeates through a univalent anion-exchange membrane into a concentration compartment. It tries to move farther toward the anode plate but is blocked by a cation-exchange membrane to remain in the concentration compartment, where it combines with a cation migrating contrariwise and carried away by the concentrated solution as a migration medium from the electrodialyzer.

The reason for which a univalent selective membrane is used as the anion-exchange membrane is that it prevents scaling due to gypsum deposition in the evaporation step where the concentrated effluent from the electrodialyzer is further concentrated. Scaling would reduce the evaporation capacity, cause mechanical damage, and make it impossible to maintain long-term stability of the evaporation process.

While any type of evaporator is employable for the present invention, a vacuum type, thin film type, or the like is preferred.

As for the kneader to be used under the invention in mixing the concentrated solution with cement, with or without the addition of coal ash, a screw feeder type, vibration type, or other kneader equivalent to those usually used in caking the fly ash from municipal refuse incinerators is preferred.

Typical mixing ratios for the concentrated solution and cement, with or without the addition of coal ash, are as follows. When the concentrated solution is used with cement, a ratio of 2:1, and when the liquid is used with cement and coal ash, a ratio of about 3:1:2, are suitable in consideration of the installation and operation costs. The mixing ratio, of course, varies with the preference given to the cost of operation or equipment and hardness and other properties required of the kneaded matter. The product leaving the kneader is disposed of following, when the need arises, compacting and curing (including drying).

EXAMPLE 1

Figure 1:
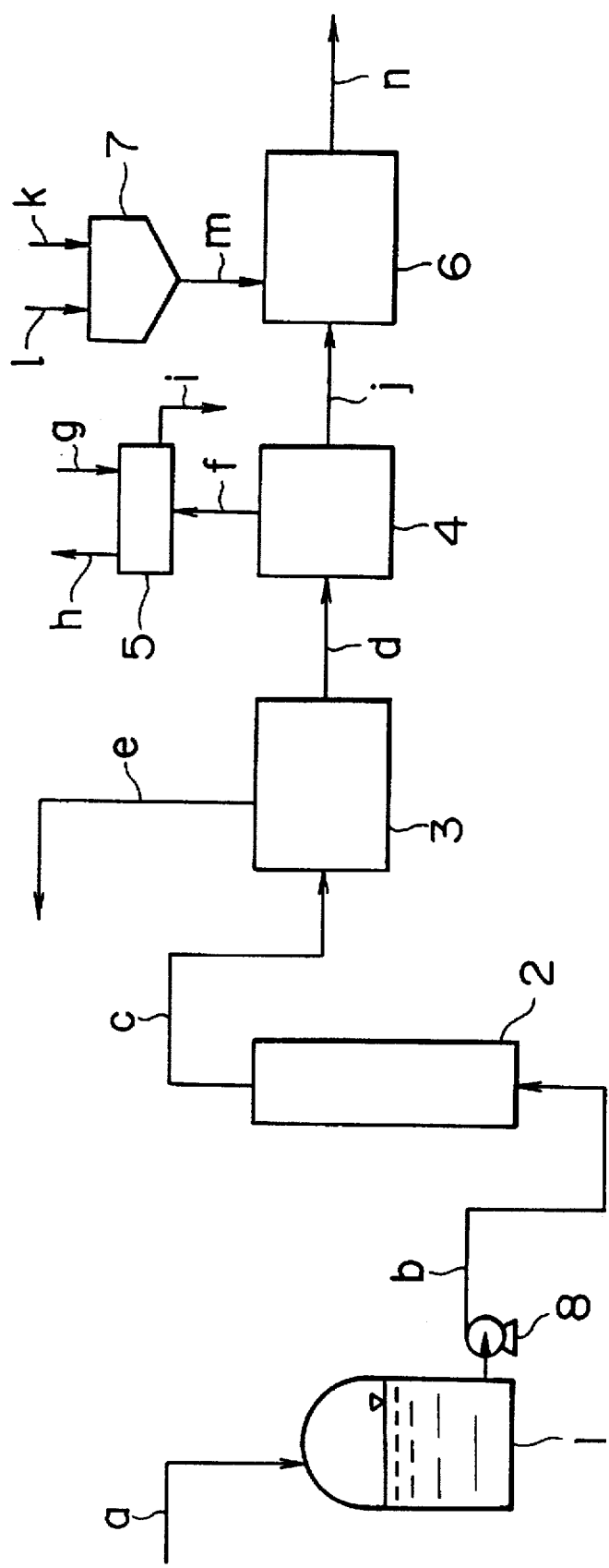
FIG. 1 is a block diagram illustrating an apparatus for carrying into practice the treating process according to the first aspect of the invention.

To demonstrate the effectiveness of effluent treatment in accordance with the first aspect of the present invention, an experiment was conducted with an apparatus of the layout shown in FIG. 1. Referring to FIG. 1, the numeral 1 indicates a tank for temporarily storing the effluent from a flue-gas desulfurization system (not shown). The numeral 2 designates a precoat filter for removing suspended solids from the effluent; 3, an electrodialyzer for primarily concentrating the effluent; 4, an evaporator for further concentrating the primarily concentrated effluent; 5, a condenser for condensing the vapor generated by the evaporator 4; 6, a solidifier for kneading the effluent secondarily concentrated by the evaporator 4 with cement, with or without the addition of coal ash, to solid mass; 7, a powder feeder for supplying either cement for solidifying the effluent or either a mixture of cement and coal ash to the solidifier 6 at a controlled rate; and 8, a pump for supplying the effluent from the tank 1 to the precoat filter at a controlled rate.

The effluent from the flue-gas desulfurization system with a salt concentration of 2 wt % as chlorine was received by the tank 1 shown in FIG. 1, via line a, at the rate of 500 kg/h. Major components in the effluent 5 are listed in Table 1.

TABLE 1

| Component | Conc. (mg/l) |
|---|---|
| $CaCl_2$ | 18,000 |
| $MgCl_2$ | 10,390 |
| NaCl | 1,270 |
| $CaSO_4$ | 1,420 |

In the experiment the effluent from the tank 1 was fed to the precoat filter 2 by the pump 8 at the rate of 500 kg/h. The precoat filter 2 used diatomaceous earth or perlite as a filter aid. The suspended solid concentration in the effluent at the outlet of the precoat filter 2, or in line c, was maintained not more than 0.2 mg/l. The precoat filter 2 was washed at predetermined intervals of operation because the accumulation of the suspended solids with time increased the filtration resistance.

The filtrate from the precoat filter 2 was transferred to the electrodialyzer 3, where it was separated into a concentrated solution with a high salt concentration (hereinafter called "the primary concentrated solution") and a diluted solution with a low salt concentration. The primary concentrated solution and the diluted solution were discharged through lines d and e, respectively, to the evaporator 4 and the outside of the system. Table 2 presents the specification of the electrodialyzer 3 and the operation conditions used.

TABLE 2

| Item | Condition |
|---|---|
| Membrane surface area | 35 $m^2$ |
| Membrane surface flow velocity | 5 cm/sec |
| Current density | 1.8 $A/dm^2$ |
| Effluent temperature | 35° C. |

In this example the salt concentrations and flow rates of the primary concentrated solution and the diluted solution were as given in Table 3. The salt concentrations in the primary concentrated solution and the diluted solution were, respectively, 10 and 1.13 wt % as chlorine, and the flow rates were 48 and 452 kg/h.

The primary concentrated solution from the electrodialyzer 3 was led through line d to the evaporator 4, where it was concentrated to a salt concentration of 25 wt % as chlorine (the resulting concentrate being herein after called "the secondary concentrated solution"). The evaporator used in this example was of the film evaporation type, and the pressure inside was controlled to be −660 mmHg and the liquid temperature inside, 85° C.

The vapor produced by the evaporator 4 was supplied through line f to the condenser 5, where it was cooled and condensed with cooling water introduced through line i. The used cooling water and the condensate were discharged from the system via lines h and i, respectively. The secondary concentrated solution from the evaporator 4 was fed through line j to the solidifier 6 at the rate of 19.2 kg/h.

The cement and coal ash required by the solidifier 6 were supplied at controlled rates through lines l and k to a powder feeder 7, where they were mixed and the mixture then was fed via a metering line m to the solidifier 6. The quantities of cement and coal supplied through lines l and k were 6.4 kg and 12.8 kg, respectively, per hour. Inside the solidifier 6 were kneaded the secondary concentrated solution, cement, and coal ash. The kneaded matter was discharged from the system by way of line n.

Figure 3:
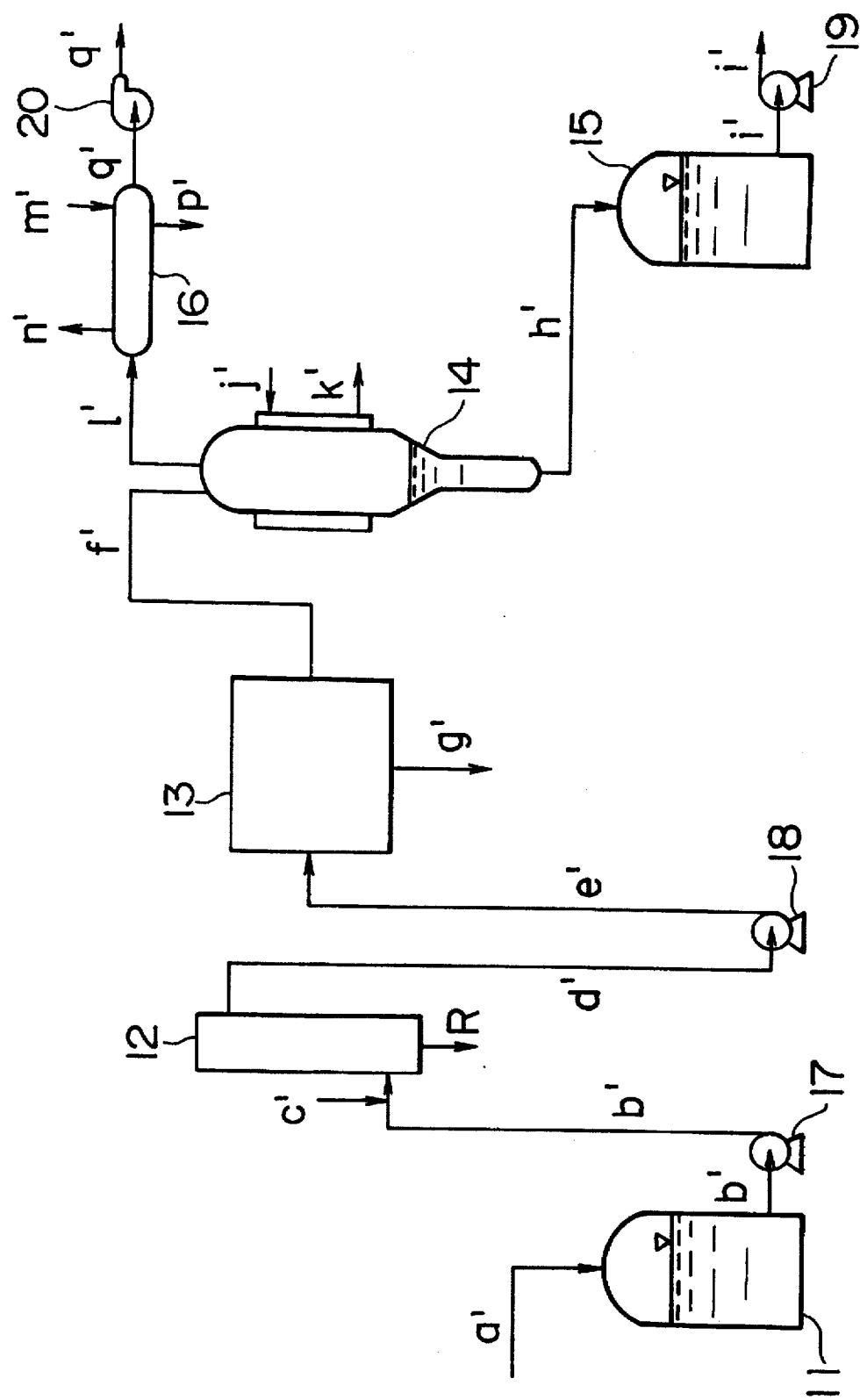
FIG. 3 is a block diagram of a treating apparatus according to the second and third aspects of the invention.
Figure 4:
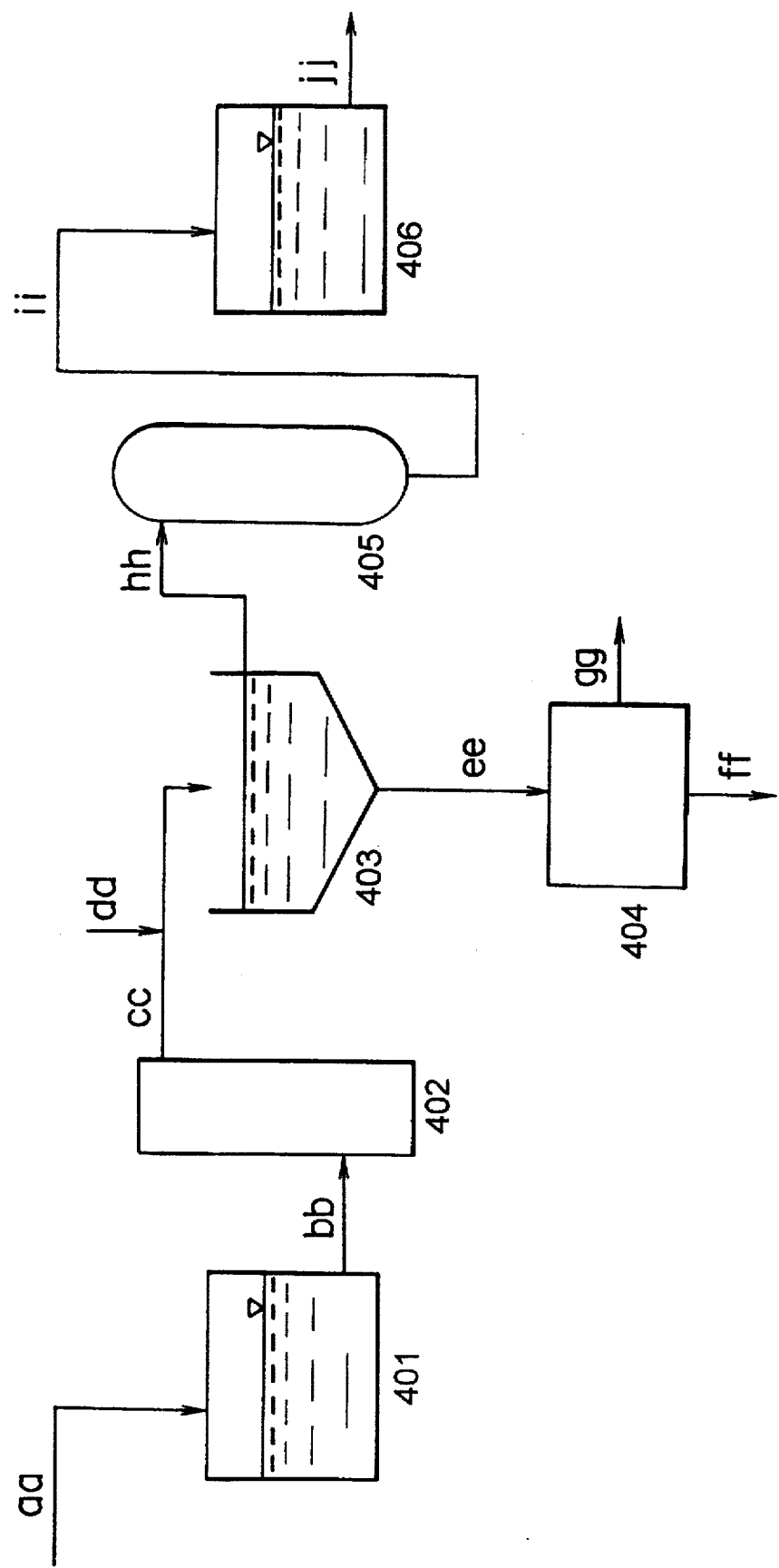
FIG. 4 is a block diagram of a prior art effluent treating apparatus.

FIG. 3 is a flow chart of the embodiment using as filtering means a precoat filter (consisting of a porous base such as ceramics and a precoat of diatomaceous earth, perlite or the like attached in the form of a film to the base) and an evaporator as a secondary concentration unit.

In FIG. 3, the numeral 11 represents a raw water tank for temporarily storing the effluent from a desulfurization system (not shown). Indicated at 12 is a pre-coat filter as means for removing suspended solids from the effluent to avoid a drop of the separation efficiency owing to the suspended solids in an electrodialyzer 13 now to be described. The

TABLE 3

| | Symbol of line in FIG. 1 | | | | | | | | | | | | | |
|---|---|---|---|---|---|---|---|---|---|---|---|---|---|---|
| | a | b | c | d | e | f | g | h | i | j | k | l | m | n |
| Effluent | | | | | | | | | | | | | | |
| Flow rate (kg/h) | 500 | 500 | 500 | 48 | 452 | (Vapor) 28.8 | — | — | 28.8 | 19.2 | — | — | — | — |
| Salt conc. (wt % as Cl) | 2.0 | 2.0 | 2.0 | 10.2 | 1.13 | <0.001 | — | — | <0.001 | 25.5 | — | — | — | — |
| Q'ty of cement (kg/h) | — | — | — | — | — | — | — | — | — | — | 12.8 | — | 12.8 | — |
| Q'ty of coal ash (kg/h) | — | — | — | — | — | — | — | — | — | — | 6.4 | 6.4 | — | |
| Q'ty of kneaded matter (kg/h) | — | — | — | — | — | — | — | — | — | — | — | — | — | 38.4 |
| Water flow rate (kg/h) | — | — | — | — | — | — | 2.500 | 2.500 | — | — | — | — | — | — |

The cement employed for this example was ordinary Portland cement of commerce, and the coal ash was obtained from a coal-fired thermal power plant operating in Japan (on domestic coal).

The kneaded mixture was dried with air at 107° C. for 60 minutes to a water content of about 30 wt %. It was tested for elution in conformity with a procedure provided for in an ordinance of the Prime Minister's Office, Japan, and was confirmed to satisfy the leaching standards stipulated in the ordinance.

The concentrations and flow rates in the individual lines so far described in this example are listed in Table 3.

Example 1 proved the effectiveness of the present invention since the process was operated uninterruptedly for 350 hours without any trouble of the apparatus.

According to the first aspect of the invention, the following advantages are offered. In a flue-gas desulfurization process whereby flue gases containing sulfur oxides gas is brought into contact with limestone powder or hydrated lime slurry to remove the sulfur oxides gas by absorption and fix it as gypsum for separation, concentration of the effluent freed from the gypsum does not cause deposition of scale due to precipitation of the gypsum. The concentrated liquid is kneaded with cement or a mixture of cement and coal ash to give a solid matter which is harmless and free of wastewater to a great advantage. The number of apparatus components is limited, the operation is quite simple and can be made practically automatic, and the frequency of maintenance needed is by far the lower than those with conventional effluent treatment system.

Further, the accumulation of the chlorine ion concentration in the effluent freed from gypsum can be retarded for the corrosion control of the apparatus.

EXAMPLE 2

Other embodiments according to the second and third aspects of the invention will be described in detail below with reference to FIG. 3.

electrodialyzer 13 separates the effluent by permeable membranes into a concentrated effluent enriched with solutes (hereinafter called "the primary concentrated effluent") and a dilute solution depleted of the solutes. The numeral 14 designates an evaporator which further concentrates by evaporation the primary concentrated effluent from the electrodialyzer 13 to a secondary concentrated effluent; 15, a secondary concentrated effluent tank for storing the secondary concentrated effluent that leaves the evaporator 14; and 16, a condenser for cooling the vapor that remits from the evaporation in the evaporator 14 with cooling water and recovering it as condensed recovery water. The numeral 17 is a pump for supplying the effluent from the raw water tank 11 to the precoat filter 12; 18 is a pump for transferring the treated water from the precoat filter 12 to the electrodialyzer 13; 19 is a pump for discharging the secondary concentrated effluent from the secondary concentrated effluent tank 15 to the outside of the system of the invention; and 20 is an evacuator for producing a negative pressure in the evaporator 14 to promote the evaporation of the primary concentrated effluent therein and forcing the resulting vapor from the evaporator into the condenser 16.

The effluent from a desulfurization system (not shown) is introduced through line a' into the raw water tank 11 for temporary storage and then fed to the precoat filter 12 by way of line b' and the pump 17. The precoat filter 12 consists of a filter aid, such as diatomaceous earth or perlite, formed as a film on a porous substrate so as to filter suspended solids. Here the diatomaceous earth as a filter aid to the precoat filter 12 is supplied via line c'. In the example under review the diatomaceous earth was deposited at the rate of 1 kg per square meter of the filtration area. The effluent freed from the suspended solids by the precoat filter 12 is conducted to the electrodialyzer 13 through line d' and the pump 18. The suspended solid concentration in the effluent in the line d' is so fixed as to enable the downstream electrodialyzer to maintain a concentration capacity beyond a predetermined level for a long period of time. In Example 2 the suspended solid concentration was kept at less than 0.2 ppm to permit uninterrupted operation for one full year.

Since the pressure loss with the precoat filter 12 increases as the filter layer collects more and more suspended solids from the effluent, it was made a role in this example to take out the suspended solid-contaminated filter aid material from the precoat filter 12 through line R and replenish fresh filter aid material through line c'.

The effluent freed from suspended solids by the precoat filter 12 in this example had a composition as shown in Table 4, containing calcium chloride and magnesium chloride as major constituents, with saturation dissolution of gypsum.

TABLE 4

| Constituent | Concentration (ppm) |
| --- | --- |
| Calcium chloride | 22,900 |
| Magnesium chloride | 6,800 |
| Gypsum | 2,600 |

In the electrodialyzer 13, cation-exchange membranes selectively permeate divalent and univalent cations such as calcium and magnesium, and anion-exchange membranes do so univalent anion, i.e., chlorine ion. These cation- and anion-exchange membranes are alternately arranged to define concentration and dilution chambers, from which a concentrated solution enriched with solutes (hereinafter called "the primary concentrated effluent") and a dilute solution depleted of the solutes are obtained.

The conditions of the cation- and anion-exchange membranes used in the electrodialyzer 13, such as the membrane surface area, current density, and membrane surface flow velocity, are given in Table 5.

TABLE 5

| Item | Condition |
| --- | --- |
| Membrane surface area | 1.7 dm$^2$ |
| Membrane surface flow density | 5 cm/s |
| Current density | 1.8 A/dm$^2$ |
| Liquid temperature | 26° C. |

Since sulfate ion ($SO_4^{2-}$) that constitutes gypsum is scarcely permeable through the anion-exchange membrane, gypsum remains in the dilute solution.

The primary concentrated effluent is fed through line f to the evaporator 14, while the dilute solution is recycled as makeup water through line g to the desulfurization system (not shown) that is the source of the effluent being treated.

In the evaporator 14, the primary concentrated effluent is enriched by evaporation and separated into a secondary concentrated effluent and vapor. The evaporator 14 is of an ordinary externally forced circulation type. To accelerate the vaporization, the evaporator 14 heats the primary concentrated effluent to 85° C. with steam or other heating medium, while maintaining a negative pressure of about 660 mmHg throughout. The heating medium is supplied by line j' to the evaporator 14 and is taken out through heat-exchanger line k'. The primary concentrated effluent in the evaporator 14 is enriched in the absence of gypsum, the principal constituent of the solid precipitate. Consequently, the evaporator 14 is free from gypsum-induced troubles of the components, line choking, or other deterioration of performance.

The secondary concentrated effluent from the evaporator 14 is transferred by way of line h' to the secondary concentrated effluent tank 15 for storage. The effluent is then discharged via line i' and the pump 19 to an ensuing station for final disposal.

Meanwhile, the vapor generated in the evaporator 14 is forced through line l' into the condenser 16 by the evacuator 20. Inside the condenser 16 the vapor is cooled and condensed to liquid by cooling water at 20° C. and is taken out as condensed recycle water from the condenser 16 through line p'. The condensed recycle water is reusable, depending on its quality, as boiler makeup water or makeup feed to the desulfurization system. In Example 2 the water was determined to have a chlorine concentration of 1 ppm or less. The condenser 16 as used in Example 2, of an ordinary shell and tube type, is supplied with cooling water at 20° C. that is necessary for the condensation of vapor, and the used cooling water is discharged from the system through heat exchanger line n'. Non-condensable gas that remains in the condenser 16 is forced out of the system through line 10 q' and the evacuator 20.

Table 6 shows the Cl and gypsum concentrations at the outlets of the component units in Example 2.

TABLE 6

| | Outlet of raw water tank 11 (line b') | Outlet of precoat filter 12 (line d') | Outlet of electro- dialyzer 13 (line f) | Outlet of evaporator 14 (line h') | Outlet of 2nd conc. effluent tank 15 (line i') |
| --- | --- | --- | --- | --- | --- |
| Calcium chloride conc. (ppm) | 22,900 | 22,900 | 123,700 | 301,900 | 301,900 |
| Magnesium chloride conc. (ppm) | 6,800 | 6,800 | 36,700 | 89,600 | 89,600 |
| Gypsum conc. (ppm) | 2,600 | 2,600 | 200 | 490 | 485 |

According to the second and third aspects of the invention, the electrodialyzer that is easy to control in operation is used as means for concentrating effluent, and therefore the effluent treatment system is less costly in operations and maintenance and requires a smaller installation area than conventional systems. The primary concentrated effluent from the electrodialyzer, after the removal of solid precipitate, is further concentrated by the evaporator for volume reduction. This permits stable operation of the evaporator, and improves the operation and reduces the cost of final disposal of the effluent.

Figure 5:
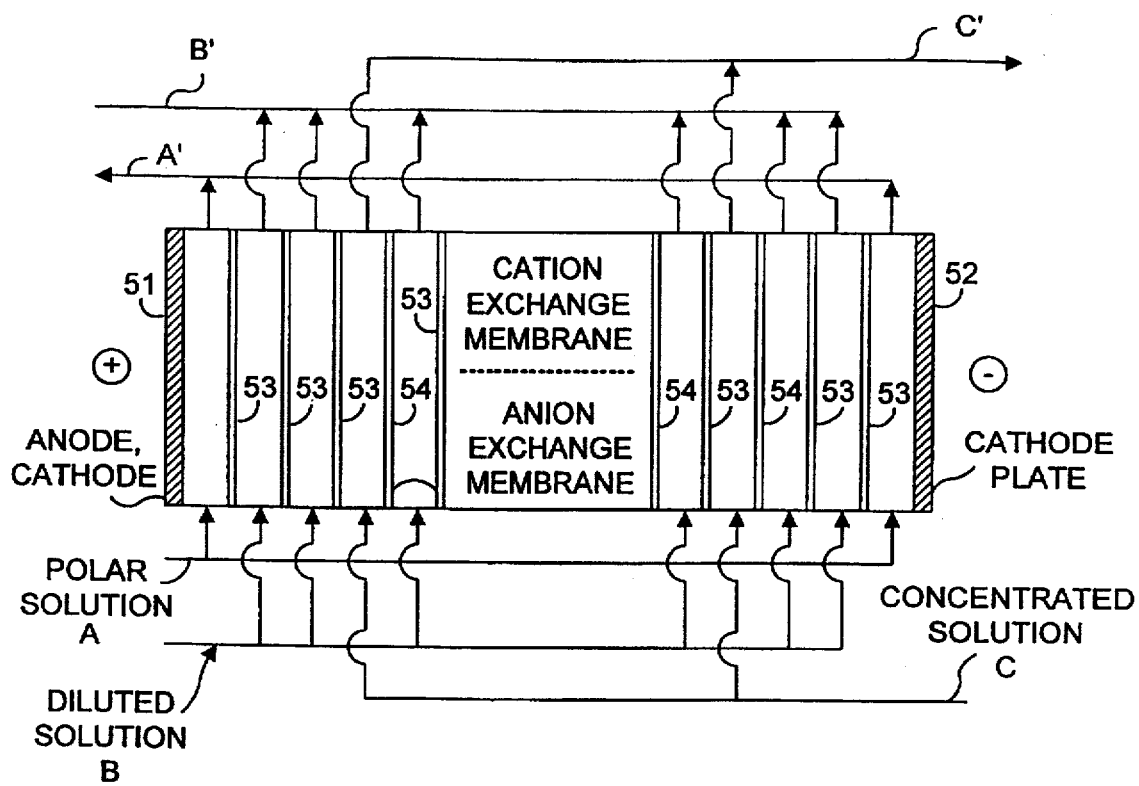
FIG. 5 is a diagram showing membrane arrangement in electrodialysis apparatus and liquid path in concentrating mode of the invention.
Figure 6:
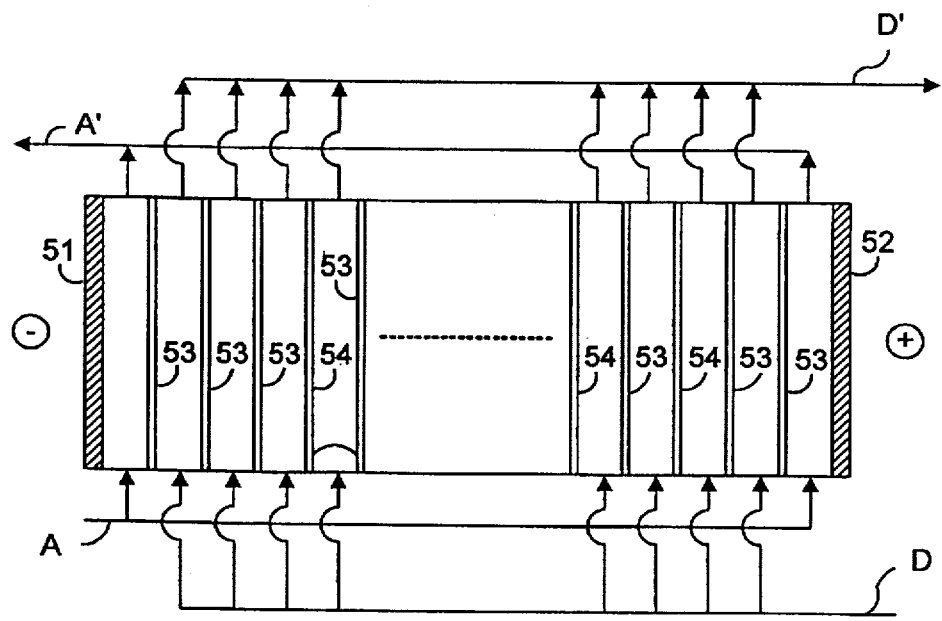
FIG. 6 is a diagram showing membrane arrangement in the electrodialysis apparatus and liquid path in membrane cleaning mode of the invention.
Figure 7:
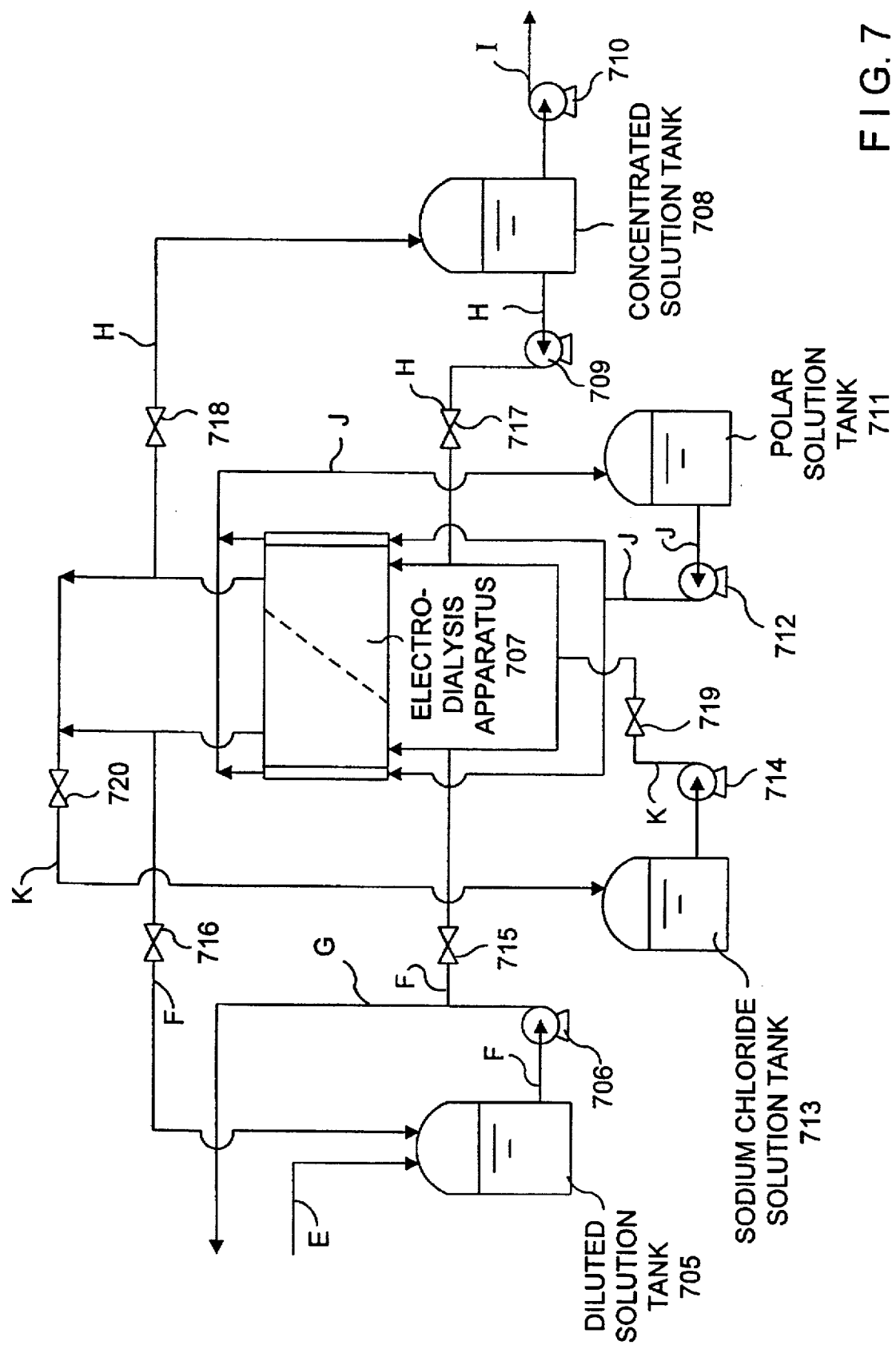
FIG. 7 is a diagram showing correlation of devices around the electrodialysis apparatus of the invention.

FIG. 5 is a diagram showing a membrane arrangement of electrodialysis in concentration, and liquid passing route, and FIG. 6 is a diagram showing a membrane arrangement in cleaning, and liquid passing route. In FIG. 5, reference numeral 51 is an anode plate, 52 is a cathode plate, 53 is a cation exchange membrane, and 54 is an anion exchange membrane. Membranes adjacent to the anode plate 51 sequentially arrange three cation exchange membranes 53 to compose the anion exchange membrane 54, and membranes adjacent to the cathode plate 52 sequentially arrange two cation exchange membranes 53 to compose the anion exchange membrane 54, and the cation exchange membrane 53 and anion exchange membrane 54 are alternately arranged between the anion exchange membrane 54 and anion exchange membrane 54. Between the anode plate 51 and adjacent cation exchange membrane 53, and between the cathode plate 52 and adjacent cation exchange membrane 53, a same polar solution is supplied from a polar solution tank (not shown) through line A, and is discharged through line A', thereby forming a circulation route, and further a route for circulating the diluted solution is formed in the second and third chambers from the anode plate 51 side and cathode plate 52 side, and a route for alternately circulating the diluted solution and concentrated solution is formed in the others. In FIG. 5, the anion exchange membrane 54 is a monovalent anion exchange membrane which hardly passes bivalent sulfate ions ($SO_4^{2-}$). FIG. 5 shows the concentrating mode, in which soluble salts from the diluted solution are moved to the concentrated solution through the respective membranes. After the concentration time corresponding to the current density, the poles and routes are changed when cleaning the membranes as shown in FIG. 2. At this time, the diluted solution and concentrated solution in concentration are extracted from the electrodialysis apparatus. In FIG. 6, reference numeral 51 is a cathode plate which was an anode plate in concentration, 52 is an anode plate which was a cathode plate in concentration, 53 is a cation exchange membrane, and 54 is an anion exchange membrane. Except for inversion of polarity and change of passing liquids, the membrane arrangement is the same as in concentration. Between the pole plates 51 and 52 and the adjacent cation exchange membrane 53, a polar solution such as sodium chloride solution is passed same as when concentrating, but in other chambers, a solution not forming crystals, such as sodium chloride solution is supplied from a tank (not shown) through line D, and is discharged through line D', thereby forming a circulation route. During this membrane cleaning process, an electric charge is applied between poles to energize the cleaning. The current density and cleaning time in the membrane cleaning process are determined by the current density and membrane cleaning time in the concentrating process. To further clarify the liquid route around the electrodialysis apparatus of the invention, a flow than is shown in FIG. 7. In FIG. 7, reference numeral 705 denotes a diluted solution tank, 706 is a diluted solution circulation pump, 707 is an electrodialysis apparatus, 708 is a concentrated solution tank, 709 is a concentrated solution circulation pump, 710 is a concentrated solution discharge pump, 711 is a polar solution tank, 712 is a polar solution circulation pump, 713 is a sodium chloride solution tank for cleaning membranes, 714 is a circulation pump of sodium chloride solution for cleaning membranes, 715, 716 are valves provided in the circulation routes of the diluted solution tank 705 and electrodialysis apparatus 707, 717, 718 are valves provided in the circulation routes of the concentrated solution tank 708 and electrodialysis apparatus 707, and 719, 720 are valves provided in the circulation routes of the sodium chloride solution tank for cleaning membranes 713 and electrodialysis apparatus 707. In FIG. 7, explaining the liquid route in concentrating, the desulfurized wastewater is supplied into the diluted solution tank 705 through line E, and is circulated into the 10 W electrodialysis apparatus 707 through line F and diluted solution circulation pump 706. At this time, the valves 715, 716 provided in the line F are open, and the soluble salts in the diluted solution moved into the concentrated solution in the electrodialysis apparatus 707, and the salt concentration is diluted. Part of the diluted solution is sent into the desulfurization plant (not shown) through line G as makeup water for desulfurized wastewater. On the other hand, the concentrated solution is circulated into the electrodialysis apparatus 707 through the line H and concentrated solution circulation pump 709 from the concentrated solution tank 708, and takes in the soluble salt from the diluted solution through the membrane in the electrodialysis apparatus 707. The corresponding portion of the soluble salts being taken in is supplied into the evaporator (not shown) in the downstream through line I and concentrated solution extraction pump 710. At this time, the valves 717, 718 in the line H are open. The polar solution is circulated into the electrodialysis apparatus 707 through line J and polar solution circulation pump 712 from the polar solution tank.

In the membrane cleaning process, then, the liquid route is explained, and in FIG. 7, the valves 715, 716 in the line F and the valves 717, 718 in the line H are all closed. In this state, from the sodium chloride solution tank for cleaning membranes 713, the sodium chloride solution for cleaning membranes is supplied and circulated into both diluted solution chamber and concentrated solution chamber in the electrodialysis apparatus 707 through line K and circulation pump for sodium chloride solution for cleaning membranes 14. At this time, the polarity is inverted from the concentrating process to energize. When membrane cleaning is over, the route returns to that of concentrating process. Hereinafter, at the anode plate side, three cation exchange membranes are sequentially arranged, and at the cathode plate side, two cation exchange membranes are sequentially arranged, of which reason is explained below. The anode solution and cathode solution require the same solution for polarity inversion in cleaning the membranes, and hence the adjacent chamber to the polar chamber must be an identical chamber for maintaining ion balance (the diluted solution chamber if diluted solution chamber, or concentrated solution chamber if concentrated solution chamber). For example, if the adjacent chamber is a concentrated solution chamber, NaCl in the polar solution is moved to the concentrated solution and is consumed, and therefore NaCl must be always supplied. If diluted solution, on the other hand, it is not necessary to supply (see FIG. 5). Hence, generally, the chamber adjacent to the polar chamber is a diluted solution chamber. Assuming breakage of a polar membrane, the polar solution lower in the hydrogen ion concentration flows into the adjacent diluted solution chamber to lower the hydrogen ion concentration of the solution, and further (when there is only one diluted solution chamber) by the move of $H^+$ ions, the hydrogen ion concentration of the concentrated solution is lowered. The concentrated solution is further concentrated by the downstream evaporator, and hence, from the viewpoint of the material of the evaporator, the hydrogen ion concentration of the solution is preferred to be higher. Thus, by arranging the number of membranes of the cation exchange membrane so as to dispose two diluted solution chambers, if the polar membrane is torn, effect on the hydrogen ion concentration in the concentrated solution is minimized. Besides, by inverting the polarity of the polar plates, the electrodialysis apparatus is cleaned, of which reason is explained below. When ordinary concentration is continued for a long period, gypsum ($CaSO_4$) precipitates in the anion exchange membrane, and the membrane function is lost, as mentioned above. The mechanism of this gypsum precipitation is not clarified, but it is evident that $Ca^{2+}$ ions and $SO_4^{2-}$ ions for composing gypsum invade into the anion exchange membrane. At this time, when energized by inverting the anode and cathode, the $Ca^{2+}$ ions and $SO_4^{2-}$ ions accumulated in the anion exchange membrane are electrically pulled out of the membrane, thereby cleaning the electrodialysis apparatus.

To verify the usefulness of the invention, in the prototype apparatus (effective membrane area 70 $m^2$), a continuous operation for 5,000 hours was conducted. The flow of the experimental apparatus was the same as that shown in FIG. 7. As the desulfurized wastewater, the actual wastewater from the desulfurization plant attached to the coal fired boiler in commercial operation was used. The chemical composition of wastewater is shown in Table 7. The polar solution was 5% sodium chloride solution, and the membrane cleaning solution was 2% sodium chloride solution. The electrodialysis condition in the concentrating process, and conditions in the membrane cleaning process are summarized in Table 8.

TABLE 7

| | |
|---|---|
| Calcium (Ca) | 5,300 |
| Magnesium (Mg) | 2,800 |
| Sodium | 1,200 |
| Chlorine (Cl) | 18,500 |
| Sulfate ($SO_4$) | 1,200 |
| Hydrogen ion concentration | 5–6 |

TABLE 8

| Concentrating process | Feed rate of desulfurized wastewater (*1) | 1.25 $m^3$/hr |
|---|---|---|
| | Membrane flow rate (*2) | 5 cm/s |
| | Temperature | 45° C. |
| | Current density | 0.9 A/$dm^2$ |
| | Concentrating operation time | 6 hr |
| Membrane cleaning process | Membrane flow rate | 5 cm/s |
| | Temperature | 15–25° C. |
| | Current density | 0.9 A/$dm^2$ |
| | Membrane cleaning time | 0.5 hr |

(*1) Shows the flow rate supplied into the diluted solution tank 705 from line E in FIG. 7.
(*2) Shows the flow rate of electrodialysis blank volume reference, the same flow rate in both diluted solution and concentrated solution.

As the evaluation of the verification experiment, the following two points were considered.

(1) The chlorine reference current efficiency should not be lowered in the course of time.

(2) Gypsum should not precipitate on any one of the ion exchange membranes.

Figure 8:
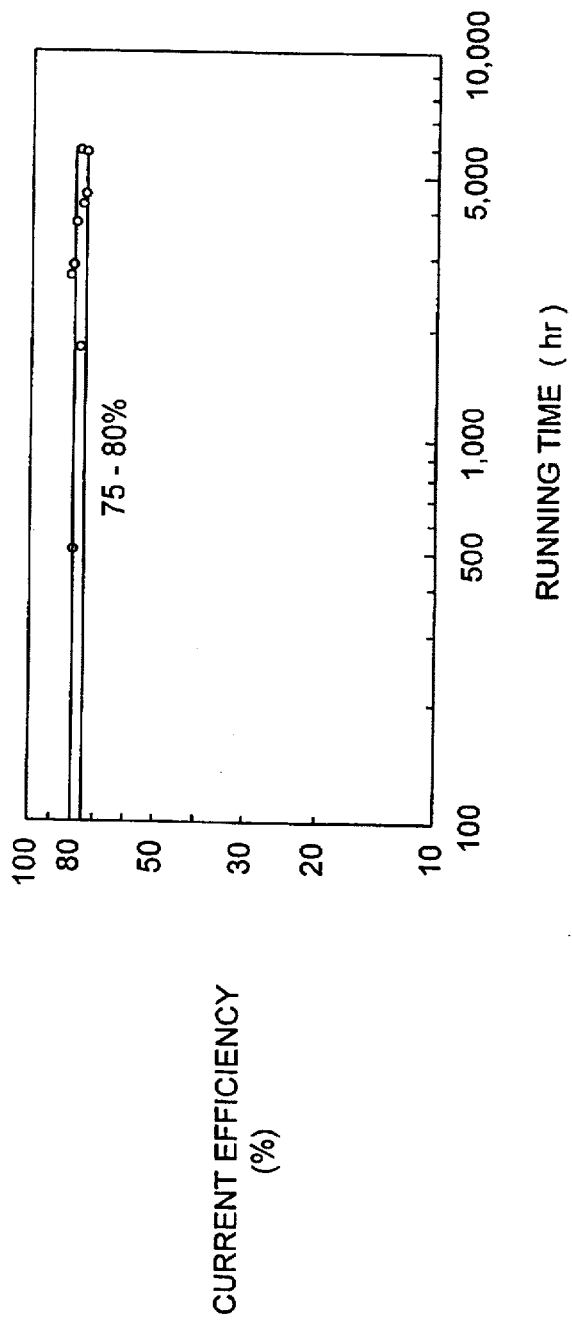
FIG. 8 is a graph showing changes in the course of time of chlorine reference current efficiency in long-term continuous experiment according to the invention.
Figure 9:
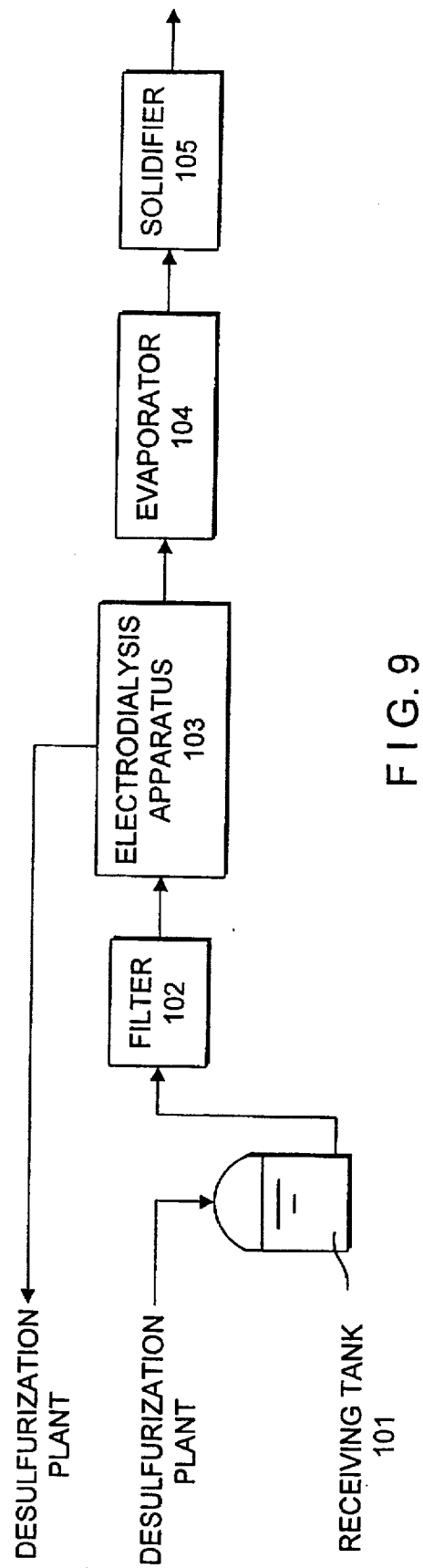
FIG. 9 is a diagram showing a proposed plan of treating process of desulfurized wastewater.
Figure 10:
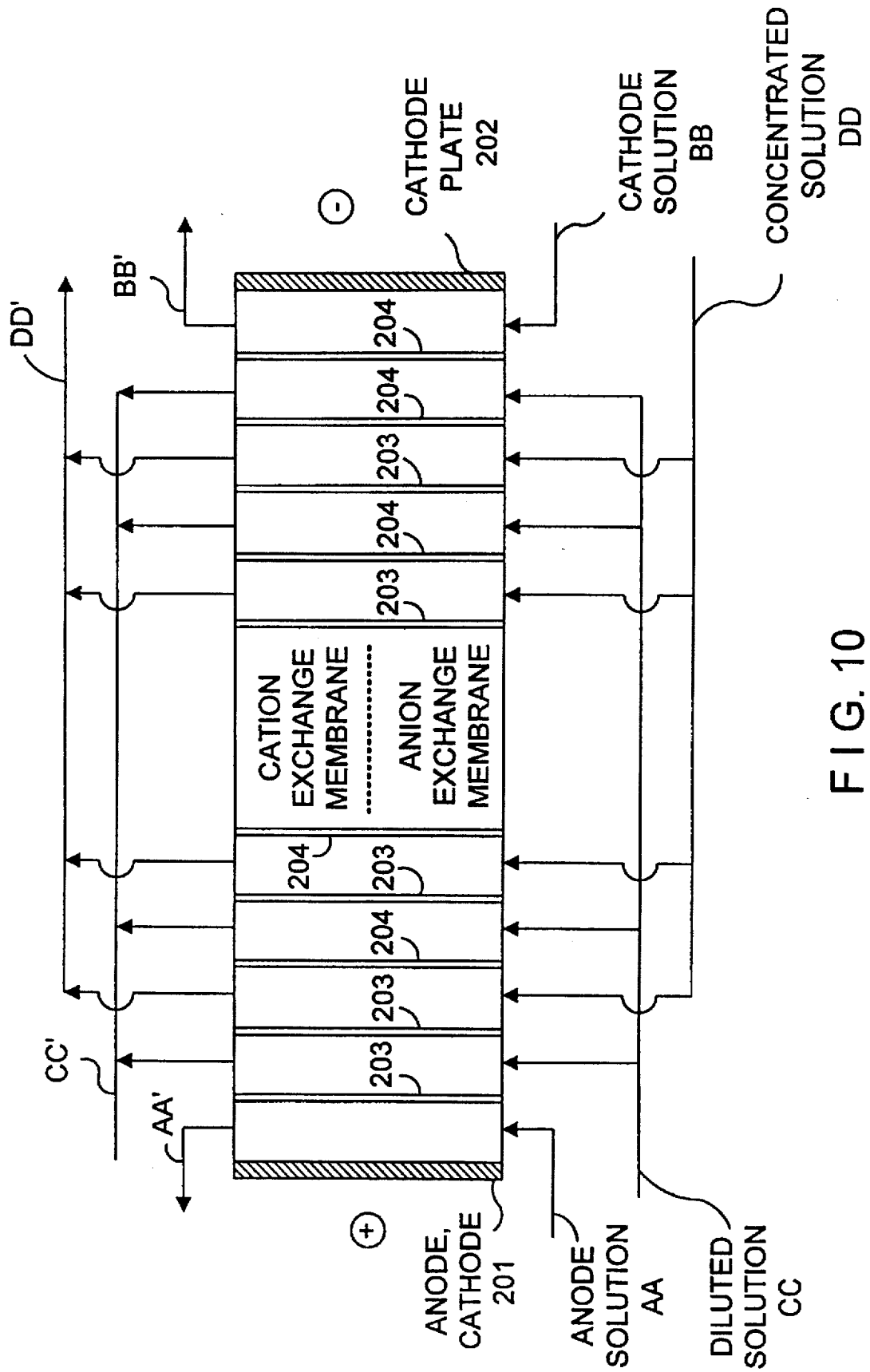
FIG. 10 is a diagram showing a proposed plan of membrane arrangement in electrodialysis apparatus and liquid path.

Concerning (1), the chlorine reference current efficiency (that is, the ratio of moving amount from diluted solution to concentrated solution of chlorine content, relative to the current feed) is suited to express the membrane concentrating performance, and if the current efficiency is not changed, it means that the membrane concentrating performance is invariable. As for (2), change of new membrane was measured by visual observation and analysis ions in the membrane by an apparatus. Thus, in both (1) and (2), the membranes were evaluated after 5,000-hour experiment, and no change was noted as compared with initial piece and new membrane. For example, changes of chlorine reference current efficiency in the course of time are shown in FIG. 8. As shown in FIG. 8, it is known that the chlorine reference current efficiency is not changed from the initial time of starting the experiment. In the invention, therefore, stable concentrating operation is enabled without gypsum precipitation even in long-term continuous operation.

We claim:

1. A process for treating effluent from a flue-gas desulfurization system wherein flue gas containing sulfur oxides gas is brought into contact with limestone or hydrated lime slurry and the sulfur oxides gas is thereby absorbed and removed and then fixed and separated as gypsum, which process comprises filtering the liquid to free it from gypsum/coal fly ash therein to produce a filtrate, transferring the filtrate to an electrodialyzer wherein cation-exchange membranes and univalent anion-exchange membranes are arranged so as to have at least two of either said cation-exchange membranes or anion-exchange membranes side-by-side directly parallel to each other, concentrating chloride ions in the solution therein by dialysis, further concentrating the solution by evaporation in an evaporator, kneading the concentrated solution with cement or a mixture of cement and coal ash to produce an inert solid matter, and thereafter disposing of the solid matter as landfill.

2. In a process for treating an effluent from a flue-gas desulfurization system wherein flue gas containing sulfur oxides and chlorine values is contacted with limestone or a hydrated lime slurry, the sulfur oxide gas is absorbed and fixed in the slurry as gypsum and the gypsum is separated leaving a liquid containing chloride ions, the improvement which comprises filtering the liquid containing the chloride ions from gypsum/coal fly ash containing therein by filtration, subjecting the filtrate to electrodialysis in an electrodialyzer comprising concentration compartments and dilution compartments formed by cation-exchange membranes and univalent anion-exchange membrane to produce a concentrated chloride ion containing solution in the dilution compartments, wherein at least two of either of said cation-exchange membranes or anion-exchange membrane are positioned side-by-side and directly parallel to each other, subjecting the concentrated chloride ion containing solution to further concentration by evaporation in an evaporator, kneading the thus further concentrated solution with cement or a mixture of cement and coal ash to form a solid, thereafter disposing of the solid, and recycling the dilute chloride ion containing solution as make up water for the slurry.

3. A method for treating desulfurized wastewater comprising performing electrodialysis thereof using an electrodialysis apparatus having ion exchange membranes adjacent to positive and negative pole plates for forming an electric field necessary for electrophoresis, formed by sequentially arranging, in this order between an anode plate and a cathode plate; first, second and third cathode exchange membranes, a first anion exchange membrane, a first additional cathode exchange membrane, a second anion exchange membrane, a second additional cathode exchange membrane, a third anode exchange membrane, and fourth and fifth cathode exchange membranes, the first and fifth cathode exchange membranes being adjacent to the respective anode and cathode plates, by passing a polar liquid between the anode plate and the adjacent first cation exchange membrane and between the cathode plate and the adjacently disposed fifth cathode plate, passing a dilute solution between the first and second, second and third cation exchange membranes, and fourth and fifth cation exchange membranes, between the first anion exchange membrane and the first additional cation exchange membrane, between the second anion exchange membrane and second additional cation membrane and between the first anion exchange resin and the fourth cation exchange membrane, and passing a concentrated solution between the third cation exchange membrane and the first anion exchange membrane and between the second additional cation exchange membrane and the third anion exchange membrane.

4. A method for cleaning a desulfurized wastewater treating electrodialysis apparatus having ion exchange membranes adjacent to positive and negative pole plates for forming an electric field necessary for electrophoresis, formed by sequentially arranging, in this order between an anode plate and a cathode plate; first, second and third cathode exchange membranes, a first anion exchange membrane, a first additional cathode exchange membrane, a second anion exchange membrane, a second additional cathode exchange membrane, a third anode exchange membrane, and fourth and fifth cathode exchange membranes, the first and fifth cathode exchange membranes being adjacent to the respective anode and cathode plates, comprising changing the polarity of the anode plate to the cathode, changing the polarity of the cathode plate to anode, and passing sodium chloride solution between the respective cathode plate, anode plate, cation and anion exchange resins.

* * * * *